UNITED STATES PATENT OFFICE.

MELVON A. MARQUETTE, OF CHICOPEE FALLS, MASSACHUSETTS, ASSIGNOR TO THE FISK RUBBER COMPANY, OF CHICOPEE FALLS, MASSACHUSETTS, A CORPORATION OF MASSACHUSETTS.

METHOD OF MAKING TIRES.

1,419,879.  Specification of Letters Patent.  Patented June 13, 1922.

No Drawing. Original application filed April 21, 1920, Serial No. 375,471. Divided and this application filed January 5, 1922. Serial No. 527,233.

*To all whom it may concern:*

Be it known that I, MELVON A. MARQUETTE, a citizen of the United States of America, residing at Chicopee Falls, in the county of Hampden and State of Massachusetts, have invented certain new and useful Improvements in a Method of Making Tires, of which the following is a specification.

This application is a division of an application filed by me April 21, 1920, Serial No. 375,471.

My present invention relates to methods of making tire casings, and has particular reference to their building and vulcanization.

It has for its object the formation of a tire casing in an expeditious manner while reducing the danger of the formation of buckles or wrinkles in the fabric. It has various other objects which will appear from the description and claims.

It is a known fact that when tire casings are subjected to the pressure of the usual two-part vulcanizing molds, including a rigid core and an outer split rigid mold the flowing of the rubber as the mold contracts upon it tends to carry the fabric with it, causing buckles at the line of intersection of the mold sections and waves following approximately the pattern of the non-skid tread. This is particularly true in the case of tire casings built up out of the so-called cord fabric, which consists of a series of cords forming a warp, either with or without a series of light weft threads, as this fabric has less resistance to distortion than the ordinary square-woven fabric. I have found that by stiffening the outer ply or plies of fabric it is possible to maintain the fabric in the position in which it was laid while the rubber flows over it, and to thus dispense with the use of water bags. This stiffening may be performed in various ways.

For example, I may partially vulcanize the outer ply or plies of fabric before building them into the casing, or even after they are so built. Or I may place over the fabric plies a partially-vulcanized sheet of rubber; and I contemplate either partially vulcanizing the cushion stock and the breaker for this purpose, or using a separate sheet of partially-vulcanized rubber.

Other ways in which any of the layers mentioned above may be stiffened is by subjecting them to any air drying process rather than to a true partial vulcanization; by solutioning the fabric rather than by frictioning it; or using for such layers a rubber compound that will be stiff when cold. Or the stock may be frictioned in the usual manner, than partially vulcanized, and a skim coat of uncured rubber applied before building the fabric into the casing. It will be understood that such stock as is built into the casing in a partially vulcanized condition may be compounded so that it will have its vulcanization completed in the same time as that necessary for the unvulcanized stock which is built into the casing to become completely vulcanized, as is well understood in the art. It is not necessary that the stiffened stock maintain its resistance after it becomes heated, for the deleterious initial pressure of the molds occurs when the rubber is cold; and by the time that the casing has become heated, the rubber has flowed to its ultimate position.

Therefore another way to accomplish my principal object is by heating the outer rubber of the casing sufficiently to soften it but not enough to materially affect the bonding rubber of the carcass. Then while this outer rubber is warm and the bonding rubber is cold the mold pressure is applied by closing the molds. The result will be to mold the covering rubber while warm so that it will flow freely for the molding operations without disturbing the fabric of the casing which is bonded together by the stiff cold rubber during the movement of the molds. When the vulcanizing heat is then applied to the whole casing, the latter has been set in the molds and is held by the mold pressure. Or the fabric layers may be chilled relative to the tread to produce the same relative effect.

The results desired may be accomplished either by stiffening the fabric or by warming the outer layers of rubber in preparation for the application of the mold pressure, or the two ways may be used together.

Having thus described my invention, I claim:

1. The method of making tire casings comprising the application of molding pressure on the casings while the outer portion is softened by heat and the fabric portion of the casing is bonded together by cold rubber, and vulcanizing the tires by heat applied to the whole casing after the latter has been formed under the molding pressure.

2. The method of vulcanizing an assembled tire casing comprising temporarily subjecting the tread and carcass of the casing to different temperatures whereby the carcass is at a lower temperature than the tread, and then applying molding pressure to the casing and subjecting the casing to vulcanizing heat.

3. In a method of vulcanizing articles composed of rubber and fabric and having the fabric substantially localized near one face of the article, warming the portion remote from the fabric without effectively heating the fabric-containing portion, and then vulcanizing the article.

4. In a method of vulcanizing between rigid molding surfaces articles composed of rubber and fabric and having the fabric substantially localized near one face of the article, warming the portion remote from the fabric without effectively heating the fabric containing portion, and then vulcanizing the article while compressed between rigid molding surfaces.

5. In a method of vulcanizing tire casings between rigid molding surfaces, warming the tread portion relative to the carcass, and then subjecting the casing to vulcanizing heat.

6. In a method of vulcanizing tire casings between rigid molding surfaces, assembling the carcass and tread portions upon a rigid core, warming the tread relative to the carcass, and then vulcanizing the casing while confined between the core and rigid outer molding surfaces.

7. In the vulcanization of tire casings, warming the tread relative to the carcass to cause the tread to conform to a molding pressure without displacing the carcass, holding the casing under molding pressure while the tread is warmer than the carcass, and subsequently vulcanizing the casing.

MELVON A. MARQUETTE.